(12) United States Patent
Obrovac et al.

(10) Patent No.: US 8,753,545 B2
(45) Date of Patent: Jun. 17, 2014

(54) COMPOSITE NEGATIVE ELECTRODE MATERIALS

(75) Inventors: Mark N. Obrovac, St. Paul, MN (US); Marc Flodquist, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 880 days.

(21) Appl. No.: 12/716,354

(22) Filed: Mar. 3, 2010

(65) Prior Publication Data

US 2011/0215280 A1 Sep. 8, 2011

(51) Int. Cl.
*H01B 1/04* (2006.01)
*H01B 1/00* (2006.01)
*H01B 1/02* (2006.01)

(52) U.S. Cl.
USPC .... 252/516; 252/500; 252/520.21; 252/521.2

(58) Field of Classification Search
None
See application file for complete search history.

(56) References Cited

U.S. PATENT DOCUMENTS

| | | | |
|---|---|---|---|
| 6,090,505 A * | 7/2000 | Shimamura et al. | 429/218.1 |
| 6,680,145 B2 | 1/2004 | Obrovac | |
| 2002/0164479 A1 * | 11/2002 | Matsubara et al. | 428/367 |
| 2006/0088767 A1 * | 4/2006 | Li et al. | 429/231.95 |
| 2007/0148544 A1 | 6/2007 | Le | |
| 2007/0224508 A1 | 9/2007 | Aramata et al. | |
| 2008/0003503 A1 | 1/2008 | Kawakami et al. | |
| 2008/0038638 A1 | 2/2008 | Zhang | |
| 2008/0113261 A1 | 5/2008 | De Jonghe | |
| 2008/0118834 A1 | 5/2008 | Yew | |
| 2008/0248386 A1 | 10/2008 | Obrovac | |
| 2009/0075173 A1 * | 3/2009 | Jeong et al. | 429/218.1 |

FOREIGN PATENT DOCUMENTS

| | | |
|---|---|---|
| JP | 2000-243396 | 8/2000 |
| JP | 2007141504 | 6/2007 |

OTHER PUBLICATIONS

Zheng, "Nano Tin Alloys Dispersed in Oxides for Lithium Storage Material", *Journal of Power Sources*, 74, pp. 624-627, (2007).
Wang, "Preparation and Characterization of a New Nanosized Silicon-Nickel-Graphite Composite as Anode Material for Lithium Ion Batteries", *Journal of Power Sources*, 89, pp. 121-126, (2009).
Idota, "Tin-Based Amorphous Oxide: A High-Capacity Lithium-Ion-Storage Material", *Science*, 276, pp. 1395-1397, (1997).
Morita et al., "Nano Si Cluster-$SiO_x$-C Composite Material as High-Capacity Anode Material for Rechargeable Lithium Batteries", *Journal of the Electrochemical Society*, 153 (2) pp. A425-A430, (2006).
Wang et al., "Study on Si-Ti Alloy Dispersed in a Glassy Matrix as an Anode Material for Lithium-Ion Batteries", *Journal of Alloys and Compounds*, 506, pp. 317-322, (2010).

\* cited by examiner

*Primary Examiner* — Randy Gulakowski
*Assistant Examiner* — Jeffrey Washville

(57) ABSTRACT

Composite particles that include an electrochemically active metal phase, an insulating phase, and a conducting phase are provided that are useful active materials in negative electrodes for lithium-ion electrochemical cells. The electrochemically active phase includes silicon. Lithium-ion electrochemical cells are provided that include the provided composite composite particles as active materials in negative electrodes as well as methods of making the provided composite particles.

23 Claims, 3 Drawing Sheets

COMPOSITE NEGATIVE ELECTRODE MATERIALS

FIELD

The present disclosure relates to compositions useful for making negative electrodes for lithium-ion electrochemical cells.

BACKGROUND

Recently, high energy lithium-ion cells have been constructed which include alloy electrochemically active materials in the negative electrode. Such materials typically have higher gravimetric and volumetric energy density than graphite alone. Alloy anode materials are typically Si or Sn-based and comprise an electrochemically active component and an electrochemically inactive component. The electrochemically inactive component limits the volume expansion of the particles. For example, Si can expand by 280% when fully lithiated (2194 mAh/cc capacity), whereas a Si/electrochemically inactive 40/60 two-component alloy will have about 112% volume expansion (1573 Ah/L capacity). This effect is a simple dilution. The total capacity is reduced linearly with the addition of an electrochemically inactive component. An undesirable property of alloy anode materials is that they can catalyze electrochemical reduction at low voltages.

Alloy anode materials are usually amorphous or nanocrystalline to improve cycling performance. Such microstructures are typically made by meltspinning, mechanical milling, or sputtering. Of these, melt spinning and mechanical milling are the most commercially viable.

There is a need for alloy anode materials that resist volumetric expansion and have high volumetric and gravimetric energy density. There is also a need for alloy anode materials that have relatively low surface area and less surface reactivity than conventional materials.

SUMMARY

Composite particles are provided that include an active metal phase comprising silicon, an insulating phase and a conductive phase which can be useful when incorporated into negative electrodes for use in lithium-ion electrochemical cells. The provided particles can have a number of advantages over pure alloy powders used as negative electrodes. Some embodiments of these composites can form low surface area powders. The provided composite particles may also be less likely to catalyze the decomposition of the electrolyte than a pure alloy anode material.

In one aspect, a composite particle is provided that includes an electrochemically active metal phase, an insulating phase, and a conducting phase, wherein the electrochemically active metal phase comprises silicon and occupies less than 50 volume percent of the volume of the composite particle, and wherein the insulating phase occupies less than 50 volume percent of the volume of the composite particle. In some embodiments, the insulating phase can occupy at least 10 volume percent of the volume of the composite particle. The composite particles can have phases that include grains that are less than about 50 nanometers in average longest dimension. The phases can be distributed substantially homogeneously throughout the particle.

The active phase comprising silicon is the only phase in the composite that reacts with lithium during normal operation of a lithium ion cell. The insulating and conducting phases are electrochemically inactive with lithium under normal operation in a lithium ion cell. An example of an undesirable phase that reacts with lithium is NiO. The reaction of NiO with lithium results in the decomposition of NiO into nickel metal and $Li_2O$. The lithium consumed in this reaction can only be removed at voltages higher than the normal operating voltage of the negative electrode material resulting in an undesirable high irreversible cell capacity.

In another aspect, a method of forming composite particles comprising an electrochemically active metal phase, an insulating phase and a conducting phase is provided that includes providing precursor materials and mechanically milling the precursor materials to form composite particles comprising an electrochemically active metal phase, an insulating phase and a conducting phase. The precursor materials may comprise an electrochemically active metal phase, an insulating phase and a conducting phase. Alternatively the precursor materials may comprise chemical elements and compounds that form the electrochemically active metal phase, insulating phase and conducting phase during the mechanical milling process.

In this disclosure:

"active metal phase" or "electrochemically active metal phase" or "electrochemically active phase" or "active phase" refers to a phase or domain that includes at least one electrochemically active metal;

"inactive metal phase" or "electrochemically inactive metal phase" or "electrochemically inactive phase" or "inactive phase" refers to a phase or domain that does not include at least one electrochemically active metal;

"conducting phase" refers to a domain that has substantially high electrical conductivity, including metallic conductors, semi-metals and semiconductors, but is not substantially electrochemically active;

"electrochemically active" refers to materials that can electrochemically react or alloy with lithium at voltages between 0 V and 2 V versus lithium metal;

"electrochemically inactive" refers to materials that are not electrochemically reactive or do not alloy with lithium at voltages between 0 V and 2 V versus lithium metal;

"insulating phase" refers to a domain that does not substantially conduct electricity and is not substantially electrochemically active;

"lithiate" and "lithiation" refer to a process for adding lithium to an electrode material;

"delithiate" and "delithiation" refer to a process for removing lithium from an electrode material;

"charge" and "charging" refer to a process for providing electrochemical energy to a cell;

"discharge" and "discharging" refer to a process for removing electrochemical energy from a cell, e.g., when using the cell to perform desired work;

"positive electrode" refers to an electrode (often called a cathode) where electrochemical reduction and lithiation occurs during a discharging process; and "negative electrode" refers to an electrode (often called an anode) where electrochemical oxidation and delithiation occurs during a discharging process.

The provided composite particles can be useful when used in negative electrodes for lithium-ion electrochemical cells. They can resist volumetric expansion and can have high volumetric and gravimetric energy density. The also can have relatively low surface area and less surface reactivity than conventional materials.

The above summary is not intended to describe each disclosed embodiment of every implementation of the present invention. The brief description of the drawings and the detailed description which follows more particularly exemplify illustrative embodiments.

DETAILED DESCRIPTION

Figure 1:
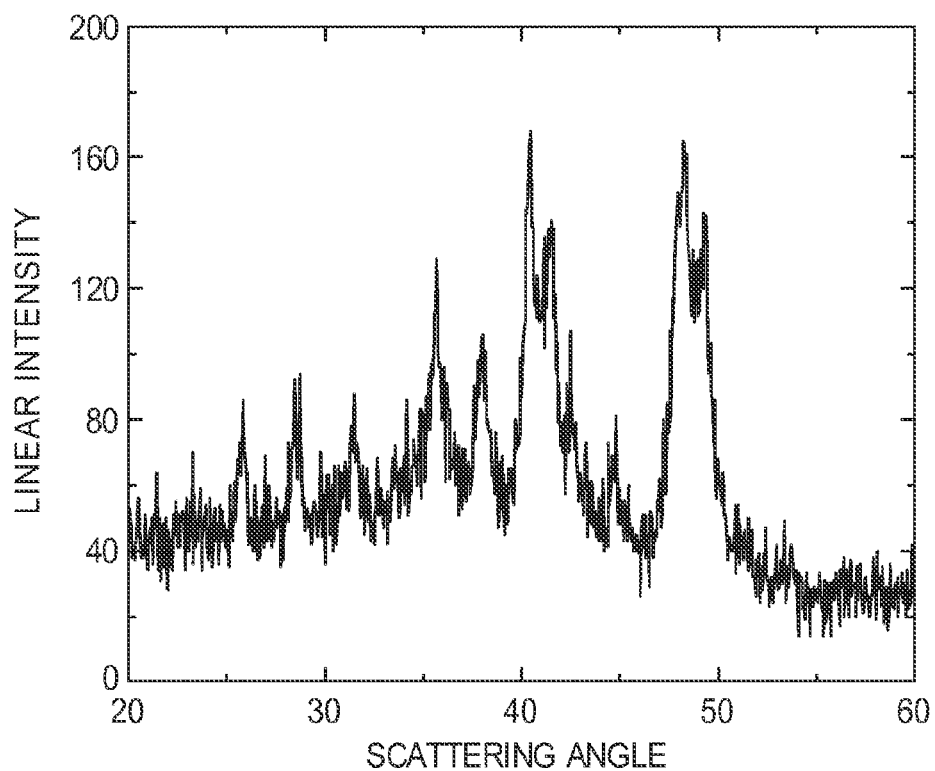
FIG. 1 displays the XRD pattern of the composite of Example 1.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Composite particles are provided that are useful as electrode components in lithium-ion electrochemical cells. The composite particles include an electrochemically active metal phase, an insulating phase, and a conducting phase. An "electrochemically active metal" is a metal that reacts with lithium under conditions typically encountered during charging and discharging in a lithium electrochemical cell at the negative electrode. In contrast, an "electrochemically inactive elemental metal" is a metal that does not react with lithium under those conditions. In both cases, the term "metal" includes materials such as silicon that are sometimes referred to as "metalloids." The electrochemically active metal includes silicon. The electrochemically active metal can also include other electrochemically active elements such as, for example, Al, C, Zn, Ga, Ge, Ag, Cd, In, Sn, Sb, Au, Hg, Pb, and Bi.

The provided composite particles also include an insulating phase which is not electrochemically active. The insulating phase can be a ceramic material. A ceramic is an inorganic, typically non-metallic, solid that can be prepared by the action of heat and subsequent cooling of constituent materials. Ceramic materials can have a crystalline or partly crystalline structure, or may be amorphous (e.g., a glass). The insulating phase can include a borate, a phosphate, a carbonate, an oxide, a sulphate, a silicate, a halide and combinations thereof. Insulating phases that are useful in the provided composite particles include oxides of Li, Na, Mg, Ca, La, Ce, Ti, Zr, K, Al, Si, B, and combinations thereof. In some embodiments, the provided composite particles include an insulating phase that is selected from $Al_2O_3$, $MgAl_2O_3$, $LiAlO_2$, $Li_2CO_3$, $SiO_2$, $B_2O_3$, LiF, and combinations thereof. The insulating phase can be stoichiometric, primarily if it is crystalline, or can be non-stoichiometric. By stoichiometric it is meant that the atomic ratios of the components of the phase can be represented by ratios of integers. Typically these components are solids and contain crystalline domains or grains. By non-stoichiometric it is meant that the atomic ratios of the components of the phase cannot be represented by a ratio of integers. Typically, non-stoichiometric phases are either partially crystalline or amorphous.

The conducting phase of the provided composite particles can be a conductor, a semi-metal or a semiconductor; and can consist of a metal element, an alloy, a carbide, an aluminide, a silicide, a boride, a nitride, or a combination thereof. Exemplary conducting phases include Ti, V, Cr, Mn, Fe, Co, Ni, Cu, and their alloys. In some exemplary composite particles, silicon can be an active metal, part of a conducting phase, and part of an insulating phase. Its function in each composite depends upon its reactivity with lithium during lithiation and delithiation, its function as a conductor of electrons, or its incorporation into an insulating phase. Exemplary carbide conducting phases include TiC and SiC. Exemplary silicide conducting phases include FeSi, $FeSi_2$, $CrSi_2$, $NiSi_2$, $CoSi_2$, $TiSi_2$, $Cu_3Si$, $ZrSi_2$, and their ternary and higher order intermetallic compounds. Other exemplary conducting phases include $TiB_2$, TiN, $FeAl_3$, and $TiAl_3$. The conducting phase can be stoichiometric or nonstoichiometric in a similar fashion to the insulating phase. The conducting phase can be crystalline or have crystalline grains, partially crystalline or amorphous.

The electrochemically active metal phase of the provided composite particles can occupy less than 50 volume percent of the volume of the particle. Also, the insulating phase can occupy less than 50 volume percent of the volume of the composite particle. In some embodiments, the insulating phase can occupy more than about 10 volume percent of the composite particle. In some embodiments at least one of the phases (electrochemically active metal phase, insulating phase, or conducting phase) can be amorphous. In other embodiments, the phases can be distributed substantially homogeneously throughout the particle, including the surface and bulk of the particle. In some embodiments, the provided composite particle includes grains that are less than about 50 nanometers in average longest dimension as observed by X-ray diffraction.

A method of making the provided composites that includes active metal phases, insulating phases, and conducting phases typically can be by providing precursor materials and mechanically milling the precursor materials. Precursor materials can include materials that are electrochemically active metals, insulators and conductors. Exemplary active metal phase precursor materials include silicon. Exemplary insulating phase precursor materials include $Al_2O_3$, $MgAl_2O_3$, $LiAlO_2$, $Li_2CO_3$, $SiO_2$, $B_2O_3$, and LiF. Exemplary conducting phase precursor materials include $FeSi_2$, $CrSi_2$, $NiSi_2$, $CoSi_2$, $TiSi_2$, $Cu_3Si$, $ZrSi_2$, $TiB_2$, TiN, $FeAl_3$, and $TiAl_3$.

Additionally, precursor materials may include chemical elements that can form an electrochemically active metal phase, insulating phase and conducting phase during the mechanical milling process. For instance if Si and $Fe_2O_3$ are mechanically milled with excess Si they can form a composite of Si, $FeSi_2$ and $SiO_2$, where Si is the active metal phase, $FeSi_2$ is the conducting phase and $SiO_2$ is the insulating phase. Exemplary precursor materials that can react to form the active metal phase, conducting phase and insulating phase during the mechanical milling process are Si and transition metal oxides including $Fe_2O_3$, NiO, $Co_3O_4$, $Cu_2O$, $Mn_2O_3$, and $ZnO_2$. Other precursor materials can be added to form the conductive phase by reacting with silicon during the milling process. For instance mechanically milling a mixture of Si, C and $Al_2O_3$ can form a composite consisting of a silicon active metal phase, a silicon carbide conducting phase and an $Al_2O_3$ insulating phase. Exemplary precursor materials that can react with silicon to form a conductive phase include Ti, V, Cr, Mn, Fe, Co Ni, Cu and carbon.

Mechanical milling can include various methods of ball milling, such as high energy ball milling, attritor milling, Sweco milling, planetary milling and low energy ball milling as described in U.S. Pat. No. 8,287,772. Mechanical milling can be performed under an inert atmosphere or under reactive atmospheres including gases such as nitrogen or hydrogen. Other methods known to make composite materials may also be used such as sputter deposition or sintering a powdered compact. In some cases the selection of active, insulating and conducting phases may be guided by the use of thermodynamics. For instance the addition of $TiO_2$ to Si is predicted by thermodynamics to result in the formation of $SiO_2$ and $TiSi_2$. Therefore $TiO_2$ and an active silicon phase are not expected to coexist in thermodynamic equilibrium. However if methods known to produce non-equilibrium phases such as mechanical milling or sputtering etc. are used as methods of making the active, insulating and conducting phase, then the resulting phases formed may not necessarily be those predicted to exist at thermodynamic equilibrium.

The provided composite particle can include a coating at least partially surrounding the particle. By "at least partially surrounding" it is meant that there is a common boundary between the coating and the exterior of the particle. The coating can function as a chemically protective layer and can stabilize, physically and/or chemically, the components of the provided particle. The coating can include any of the materials that are also used for the insulating or conducting phases of the particle. Additionally, coatings useful for stabilizing lithium metal can also be useful as coatings for the provided particle. Other exemplary materials useful for coatings include LiPON glass, phosphates such as lithium phosphate ($Li_3PO_4$), lithium metaphosphate ($LiPO_3$), lithium dithionate ($LiS_2O_4$), lithium fluoride (LiF), lithium metasilicate ($LiSiO_3$), and lithium orthosilicate ($Li_4SiO_4$). The coating can be applied by milling, solution deposition, vapor phase processes, or other processes known to those of ordinary skill in the art. Further disclosures of materials useful as coatings for the provided composite particles can be found, for example, in U.S. Pat. Publ. Nos. 2008/0113261 (De Jonghe et al.) and 2008/0118834 (Yew et al.).

Also provided are lithium-ion electrochemical cells that include a positive electrode and a provided negative electrode comprising composite particles as described above. Exemplary positive electrode materials include lithium transition metal oxide intercalation compounds such as $LiCoO_2$, $LiCo_{0.2}Ni_{0.8}O_2$, $LiMn_2O_4$, $LiFePO_4$, $LiNiO_2$, or lithium mixed metal oxides of manganese, nickel, and cobalt in any proportion. Blends of these materials can also be used in positive electrodes. Other exemplary cathode materials are disclosed in U.S. Pat. No. 6,680,145 (Obrovac et al.) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers. Suitable lithium-containing grains can be selected from lithium oxides, lithium sulfides, lithium halides (e.g., chlorides, bromides, iodides, or fluorides), or combinations thereof.

Composite particles prepared according to the provided methods can be dispersed in a polymeric binder to form a negative electrode composition using techniques well known in the battery art. Exemplary polymeric binders include oxo-acids and their salts, such as sodium carboxymethylcellulose, polyacrylic acid and lithium polyacrylate. Other examples of polymeric binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly (alkyl vinyl ethers); perfluorinated poly(alkoxy vinyl ethers); or combinations thereof. Other polymeric binders include polyimides such as the aromatic, aliphatic or cycloaliphatic polyimides and polyacrylates. The polymeric binder may be crosslinked. Crosslinking can improve the mechanical properties of the binders and can improve the contact between the electrochemically active material composition and any electrically conductive diluent that can be present.

Electrode compositions can contain additives such as will be familiar to those skilled in the art. For example, the electrode composition can include an electrically conductive diluent to facilitate electron transfer from the powdered material to a current collector. Electrically conductive diluents include, but are not limited to, carbons (e.g., carbon black for negative electrodes and carbon black, flake graphite and the like for positive electrodes), powdered metal, metal nitrides, metal carbides, metal silicides, and metal borides. Representative electrically conductive carbon diluents include carbon blacks such as Super P and Super S carbon blacks (both from MMM Carbon, Belgium), Shawanigan Black (Chevron Chemical Co., Houston, Tex.), acetylene black, furnace black, lamp black, graphite, carbon fibers and combinations thereof.

Useful electrode compositions can also include graphite acting as an active material. Graphites are active negative electrode materials and are furthermore useful in decreasing the porosity of the electrode during the calendaring process. Examples of useful graphites are MAG-E (Hitachi Chemical Co. Ltd., Tokyo, Japan) and SLP30 and SFG-44 (both from TIMCAL Ltd., Bodio, Switzerland). Other additives that can be useful in the provided electrode compositions can include an adhesion promoter that promotes adhesion of the powdered material or electrically conductive diluent to the binder or a surfactant that can promote dispersion of the electrode ingredients in a coating solvent.

To make a negative electrode, the negative electrode composition, optionally containing coating viscosity modifiers such as carboxymethylcellulose and other additives known by those skilled in the art, is mixed in a suitable coating solvent such as water, ethanol, methanol, isopropanol, n-propanol or N-methylpyrrolidinone with a polymeric binder to form a coating dispersion or coating mixture. The dispersion is mixed thoroughly and then applied to the metal foil current collector by any appropriate dispersion coating technique (e.g., knife coating, notched bar coating, slot-die coating, dip coating, spray coating, electrospray coating, or gravure coating).

The current collectors are typically thin foils of conductive metals such as, for example, copper, stainless steel, or nickel foil. After the slurry is coated onto the current collector foil, it is allowed to dry followed usually by drying in a heated oven, typically set at about 80° C. to about 300° C., for about an hour to remove solvent. The negative electrode can be compressed by pressing between two plates or rollers, as known by those skilled in the art. The electrode may also be provided with a raised pattern as disclosed in U.S. Pat. Publ. No. 2008/0248386 (Obrovac et al.).

Positive electrodes can be formed in similar manner to the negative electrode, for example, from a positive electrode composition coated on an aluminum current collector. Exemplary positive electrode compositions may include a polymeric binder and an electrically conductive diluent.

The positive electrode and negative electrode can be combined with an electrolyte to form a lithium ion electrochemical cell. Methods of fabricating a lithium ion electrochemical cell will be well known to one of ordinary skill in the battery art. In the cell, the electrolyte is in contact with both the positive electrode composition and the negative electrode composition, and the positive electrode and the negative electrode are not in physical contact with each other; typically, they are separated by a polymeric separator film sandwiched between the electrodes.

The electrolyte may be liquid, solid, or a gel. Examples of solid electrolytes include polymeric electrolytes such as polyethylene oxide, polytetrafluoroethylene, fluorine-containing copolymers, and combinations thereof. Examples of liquid electrolyte solvents include ethylene carbonate (EC), 1-fluoroethylene carbonate (FEC), diethyl carbonate (DEC), dimethyl carbonate (DMC), ethyl methyl carbonate (EMC), vinyl carbonate (VC), propylene carbonate (PC), and combinations thereof. The electrolyte solvent is provided with a lithium electrolyte salt to make an electrolyte. Examples of suitable lithium electrolyte salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof.

Electrochemical cells that include electrodes with the provided composite particles can be used in a variety of devices, including portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide battery pack. Further details regarding the construction and use of rechargeable lithium-ion cells and battery packs will be familiar to those skilled in the art.

Objects and advantages of this invention are further illustrated by the following examples, but the particular materials and amounts thereof recited in these examples, as well as other conditions and details, should not be construed to unduly limit this invention.

EXAMPLES

X-ray Diffraction (XRD) Characterization

X-ray diffraction was used to identify the crystalline structure and grain size of the exemplary composites below. A Siemens D500 diffractometer equipped with a copper target X-ray tube and a diffracted beam monochromator was used for the diffraction measurements. The emitted X-rays utilized were the Cu $K_{\alpha1}$ ($\lambda$=1.54051 Å) and Cu $K_{\alpha2}$ ($\lambda$=1.54433 Å). The divergence and anti-scatter slits used were set both at 0.5°, while the receiving slit was set at 0.2 mm. The X-ray tube was powered to 45 kV at 40 mA.

Example 1

An ingot of $Si_{88.1}Fe_{10}Ti_{10}$ was prepared by melting together under an argon atmosphere 35.232 g of Si metal chunks, 7.952 g of Fe metal chunks and 6.816 g of Ti metal sponge in an ARC furnace. The resulting ingot was broken and ground by hand into a fine powder. 1.898 g of the $Si_{88.1}Fe_{10}Ti_{10}$ ingot powder, 0.065 g of graphite (SFG 44) and 0.537 g of $Li_2CO_3$ were charged in a 8009 Round-Ended Hardened Steel Vial (Spex CertiPrep, Metuchen, N.J.) with 110 g of 3/16" tungsten carbide balls and sealed under an inert atmosphere and milled for two hours in a 8000D Dual Mixer/Mill (Spex CertiPrep, Metuchen, N.J.). The XRD pattern of the resulting composite is shown in FIG. 1. Peaks corresponding to elemental silicon are present in the XRD pattern. According to the Scherrer equation, the grain size of the silicon phase does not exceed 145 Å. The other peaks in the XRD pattern are believed to be from transition metal silicide phases. Amorphous SiC and $Li_2CO_3$ phases are also thought to be present, but peaks from these phases are too broad to be resolved. Therefore this sample is thought to be a composite of silicon, metal silicide, amorphous silicon carbide and amorphous lithium carbonate.

Electrodes comprising the composite particles and lithium polyacrylate (LiPAA) with a 94.8/5.2 weight ratio were made by placing 1.532 g of the composite particles, 1.64 g of a 10% aqueous solution of 250 K molecular weight LiPAA and 0.9 g of water in a 45-milliliter stainless steel vessel with four tungsten carbide balls (12.75 mm diameter) and mixing in a planetary micro mill (PULVERISETTE 7, from Fritsch GmbH, Idon-Oberstein, Germany) at a speed setting of two for one hour. The resulting slurry was then coated onto a copper foil using a coating bar with a 0.004" gap and dried under vacuum at 120° C. for two hours. Coin cell electrodes were then punched from this foil.

Figure 2:
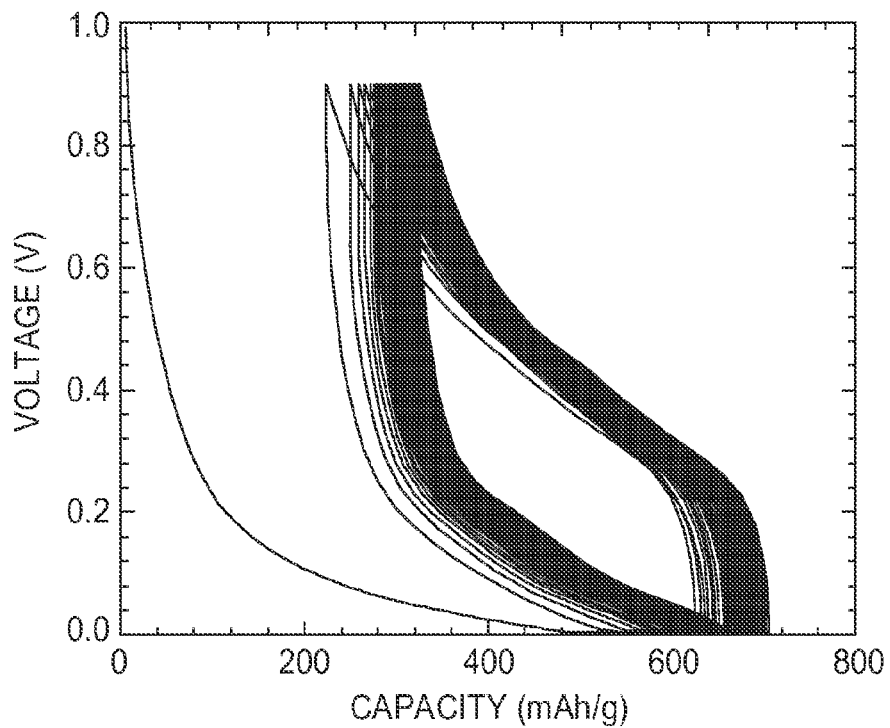
FIG. 2 is a graph of the voltage (V) vs. capacity (mAh/g) of an electrode that includes the composite of Example 1.
Figure 3:
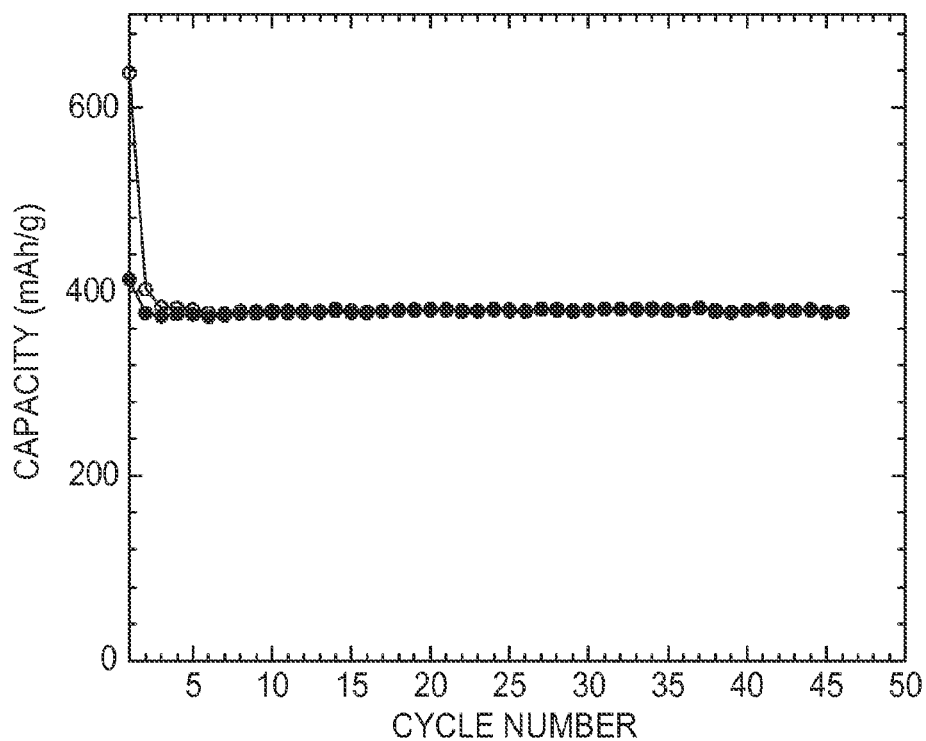
FIG. 3 is a graph of the capacity (mAh/g) vs. cycle number of an electrode that includes the composite of Example 1.

Electrochemical 2325 coin cells were made with the composite particle electrodes versus a lithium foil counter/reference electrode and 1M $LiPF_6$ in EC:DEC:FEC 30:61:9 w/w/w electrolyte. The cells were cycled at a current of 62 μA/g and held at 5 mV at the end of every lithiation half-cycle until the current decayed to a value of 12 μA/g or less before starting the next delithiation half-cycle. The voltage curve voltage curve and cycling characteristics of this composite are shown in FIGS. 2 and 3. The composite had a reversible capacity of about 380 mAh/g.

Based on the densities of $Li_2CO_3$ and the metallic elements contained in the composite particles, the estimated density of the composite particles is 2.62 g/ml and the amount of $Li_2CO_3$ contained in the composite particles is 27% by volume. In order for the composite particles to have the capacity measured, the amount of active silicon in the composite particles corresponds to 12% by volume. Therefore the amount of conducting silicide and carbide phases contained in the composite particles is about 61% by volume.

Example 2

Figure 4:
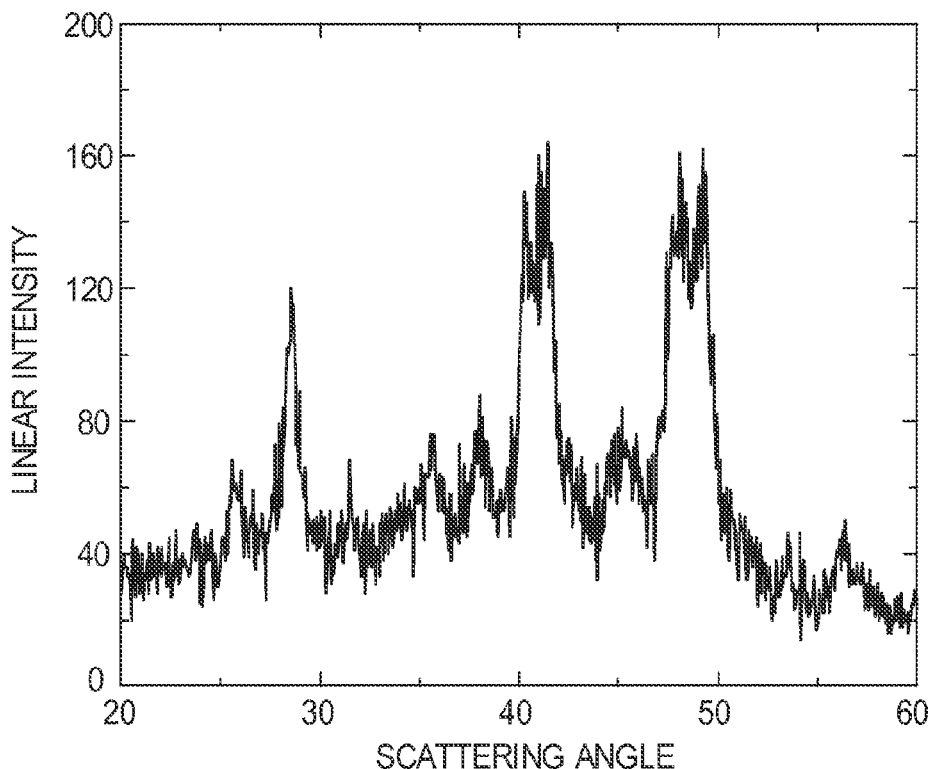
FIG. 4 displays the XRD pattern of the composite of Example 2.

2.180 g of the $Si_{88.1}Fe_{10}Ti_{10}$ ingot powder described in Example 2 was ball milled together with 0.075 g of SFG 44 carbon and 0.745 g of $LiAlO_2$ powder using the same procedure as in Example 1. The XRD pattern of the resulting composite particles is shown in FIG. 10. Peaks corresponding to elemental silicon are present in the XRD pattern as shown in FIG. 4. According to the Scherrer equation, the grain size of the silicon phase does not exceed 145 Å. The other peaks in the XRD pattern are believed to be from transition metal silicide phases. Amorphous $LiAlO_2$ and SiC phases are also thought to be present, but peaks from these phases are too broad to be resolved.

Figure 5:
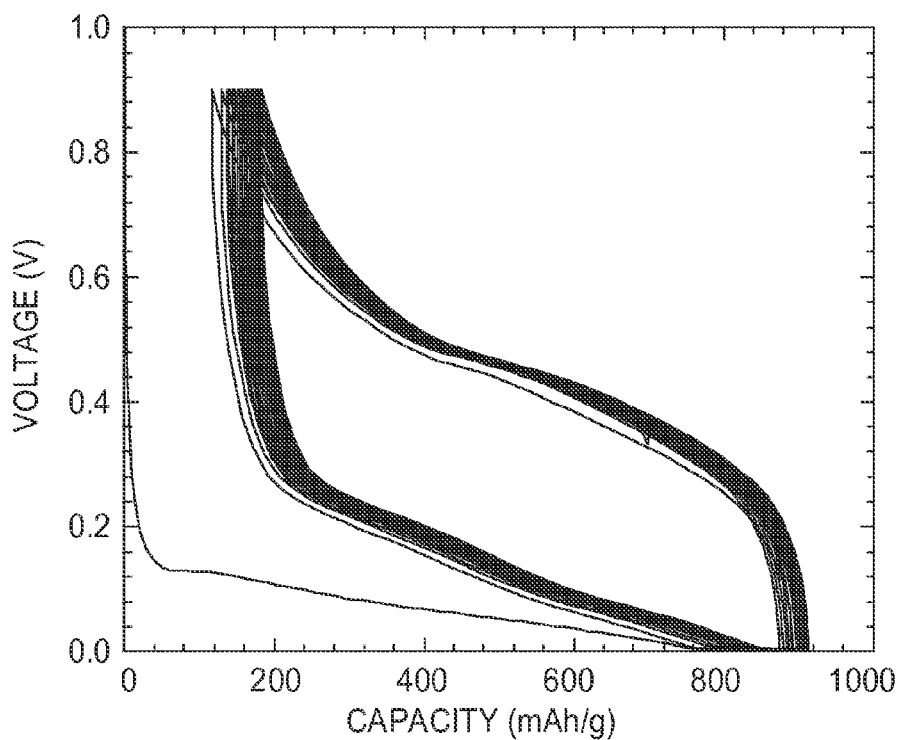
FIG. 5 is a graph of the capacity (mAh/g) vs. cycle number of an electrode that includes the composite of Example 2.
Figure 6:
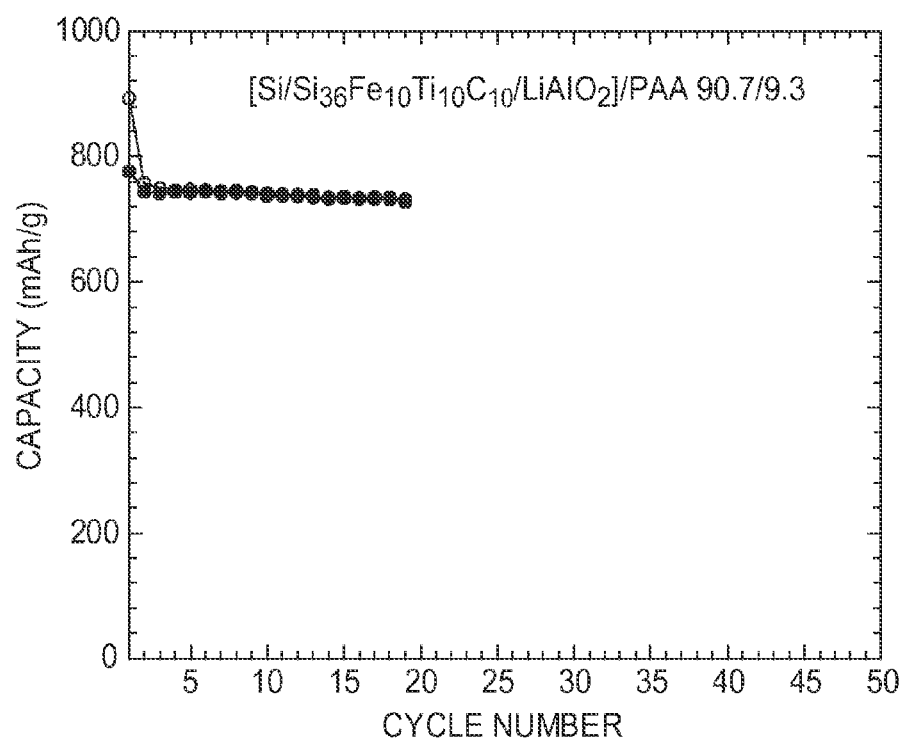
FIG. 6 is a graph of the capacity (mAh/g) vs. cycle number of an electrode that includes the composite of Example 2.

Electrodes comprising this composite and LiPAA in a 90.7/9.3 w/w ratio were made in the same way as in Example 1, excepting that 1.60 g of this composite was used as the electrochemically active phase in the slurry. Electrochemical coin cells using these electrodes were also made and cycled in the same way as in Example 1 excepting that the cells were cycled at a current of 76 μA/g and held at 5 mV at the end of every lithiation half-cycle until the current decayed to a value of 15 μA/g or less before starting the next delithiation half-cycle. The voltage curve voltage curve and cycling characteristics of the composite particles are shown in FIGS. 5 and 6.

Based on the densities of $LiAlO_2$ and the metallic elements contained in the composite particles, the estimated density of the composite is 2.60 g/ml and the amount of $LiAlO_2$ contained in the composite particles is 31% by volume. In order for the composite particles to have the capacity measured, the amount of active silicon in the composite particles corresponds to 23% by volume. Therefore the amount of conducting silicide and carbide phases contained in the composite particles is about 46% by volume.

Examples 3-25

Samples were made with an electrochemically active, electrically conductive, and electrically insulating phase. Sample volumes were made 1 cubic centimeter at a time. The total volume of electrochemically active phase was 0.4 mL for all samples. The total volume of the insulating phase was varied in increments of 0.1 mL from 0-0.6 mL with the conductive phase making up the balance. Table 1 lists the materials used.

TABLE 1

Material List

| Component | Manufacturer | Purity | Particle Size | Density (g/cm³) |
|---|---|---|---|---|
| Si | Sigma Aldrich | 99 | 325 mesh | 2.3 |
| $Al_2O_3$ | Sigma Aldrich |  | 150 mesh | 4 |
| $LiAlO_2$ | Sigma Aldrich |  | powder | 3.4 |
| $MgAl_2O_4$ | Alfa Aesar | 99 | powder | 3.5 |
| Fumed Silica | Sigma Aldrich | 99.8 | 0.007 microns | 2.3 |
| $Li_2B_4O_7$ | Sigma Aldrich | 99.9 | <10 microns | 2.44 |
| $CeO_2$ | Union Molycorp |  | powder | 7.2 |
| ZnO | J.T. Baker | 99 | powder | 5.65 |
| $MoO_2$ | Sigma Aldrich | 99 | 10-20 microns | 6.4 |
| CuO | Sigma Aldrich | 99 | <5 micron | 6.3 |
| $ZrO_2$ | Sigma Aldrich | 99.5 | Submicron | 5.8 |
| $TiO_2$ | Sigma Aldrich | 99.8 | powder | 3.9 |
| $TiSi_2$ | In house |  |  | 3.6 |
| TiC | Sigma Aldrich | 98 | 325 mesh | 4.9 |
| Silicide of Iron | Alfa Inorganics |  | powder | 4.9 |
| Co | Fisher Scientific | 99.3 | powder | 8.8 |

To make a sample the mass of each component in the sample was determined by multiplying the density of the component by the component's volume. For example a sample with volumes of 0.4/0.3/0.3 cm³ of $Si/Al_2O_3/TiSi_2$ respectively would have masses of 0.92/1.2/1.08 g for each component.

Samples were mixed in a 8009 Round-Ended Hardened Steel Vial (Spex CertiPrep, Metuchen, N.J.) with 140 g of 0.19 cm WC media, sealed under an inert atmosphere and milled for two hours in a 8000D Dual Mixer/Mill (Spex CertiPrep, Metuchen, N.J.). The XRD pattern of the resulting composite was measured. Table 2 lists the composition and volume percent of the composites that were cycled. Table 3 lists the phases observed in the XRD from the composites in Table 2 as well as the largest grain size as determined by the Scherrer equation.

TABLE 2

Cycled Compositions

| Example Number | Electrochemically Active Phase | Insulating Phase | Conducting Phase | Volume Percent 1 | Volume Percent 2 | Volume Percent 3 |
|---|---|---|---|---|---|---|
| 3 | Si | $LiAlO_2$ | $TiSi_2$ | 40 | 50 | 10 |
| 4 | Si | $LiAlO_2$ | $TiSi_2$ | 40 | 40 | 20 |
| 5 | Si | $LiAlO_2$ | $TiSi_2$ | 40 | 30 | 30 |
| 6 | Si | $LiAlO_2$ | $TiSi_2$ | 40 | 20 | 40 |
| 7 | Si | $LiAlO_2$ | $TiSi_2$ | 40 | 10 | 50 |
| 8 | Si | $Al_2O_3$ | $TiSi_2$ | 40 | 50 | 10 |
| 9 | Si | $Al_2O_3$ | $TiSi_2$ | 40 | 40 | 20 |
| 10 | Si | $Al_2O_3$ | $TiSi_2$ | 40 | 30 | 30 |
| 11 | Si | $Al_2O_3$ | $TiSi_2$ | 40 | 20 | 40 |
| 12 | Si | $Al_2O_3$ | $TiSi_2$ | 40 | 10 | 50 |
| 13 | Si | $Al_2O_3$ | $TiSi_2$ | 40 | 0 | 60 |
| 14 | Si | $MgAl_2O_4$ | $TiSi_2$ | 40 | 40 | 20 |
| 15 | Si | $MgAl_2O_4$ | $TiSi_2$ | 40 | 30 | 30 |
| 16 | Si | $SiO_2$ | $TiSi_2$ | 40 | 30 | 30 |
| 17 | Si | $SiO_2$ | $TiSi_2$ | 40 | 20 | 40 |
| 18 | Si | $LiAlO_2$ | $FeSi_2$ | 40 | 40 | 20 |
| 19 | Si | $LiAlO_2$ | $FeSi_2$ | 40 | 30 | 30 |
| 20 | Si | $LiAlO_2$ | $FeSi_2$ | 40 | 20 | 40 |
| 21 | Si | $LiAlO_2$ | $FeSi_2$ | 40 | 10 | 50 |
| 22 | Si | $Al_2O_3$ | $FeSi_2$ | 40 | 30 | 30 |
| 23 | Si | $Al_2O_3$ | $FeSi_2$ | 40 | 20 | 40 |
| 24 | Si | $Al_2O_3$ | TiC | 40 | 30 | 30 |
| 25 | Si | $SiO_2$ | $FeSi_2$ | 40 | 30 | 30 |

TABLE 3

Phases Observed by XRD and Largest Grain Size (Sherrer Equation)

| Example Number | Electrochemically Active Phase | Insulating Phase | Conducting Phase | Largest Grain Size (Ångstroms) |
|---|---|---|---|---|
| 3 | Si | $LiAlO_2$ | $TiSi_2$ | 67 |
| 4 | Si | $LiAlO_2$ | $TiSi_2$ | 108 |
| 5 | Si | $LiAlO_2$ | $TiSi_2$ | 119 |
| 6 | Si | $LiAlO_2$ | $TiSi_2$ | 124 |
| 7 | Si | $LiAlO_2$ | $TiSi_2$ | 118 |
| 8 | Si | $Al_2O_3$ | $TiSi_2$ | 112 |
| 9 | Si | $Al_2O_3$ | $TiSi_2$ | 120 |
| 10 | Si | $Al_2O_3$ | $TiSi_2$ | 134 |
| 11 | Si | $Al_2O_3$ | $TiSi_2$ | 119 |
| 12 | Si | $Al_2O_3$ | $TiSi_2$ | 149 |
| 13 | Si | $Al_2O_3$ | $TiSi_2$ | 136 |
| 14 | Si | $MgAl_2O_4$ | $TiSi_2$ | 97 |
| 15 | Si | $MgAl_2O_4$ | $TiSi_2$ | 106 |
| 16 | Si | $SiO_2$ | $TiSi_2$ | 138 |
| 17 | Si | $SiO_2$ | $TiSi_2$ | 131 |
| 18 | Si | $LiAlO_2$ | $FeSi_2$ | 107 |
| 19 | Si | $LiAlO_2$ | $FeSi_2$ | 98 |
| 20 | Si | $LiAlO_2$ | $FeSi_2$ | 97 |
| 21 | Si | $LiAlO_2$ | $FeSi_2$ | 114 |
| 22 | Si | $Al_2O_3$ | $FeSi_2$ | 91 |
| 23 | Si | $Al_2O_3$ | $FeSi_2$ | 121 |
| 24 | Si | $Al_2O_3$ | TiC | 124 |
| 25 | Si | $SiO_2$ | $FeSi_2$ | 112 |

Electrodes were made consisting of 83% by volume of the composite particles and 17% by volume of LiPAA binder. The electrodes were prepared by making a slurry consisting of 520 uL of the composite particles (based on the bulk density of the particles), 1.64 g of a 10% by weight LiPAA solution in water and 0.90 g of water. The slurry was mixed, coated and dried using the same procedure as in Example 1 to produce the electrodes. The resulting electrodes were assembled into coin cells using the same procedures as in Example 1. Each coin cell electrode typically contained 7 mg of composite particles. The coin cells were evaluated using the following protocol. The composite particles were first lithiated (half-cell undergoing discharge) at a current of 0.5 mA until the cell voltage dropped to 0.005 V, this voltage was maintained until the current dropped to 0.05 mA. The composite particles were then delithiated (half-cell undergoing charge) at a current of 0.5 mA until the cell voltage reached 0.9 mV. After this first discharge/charge cycle, for subsequent cycles the cell was discharged at a current of 1 mA till the cell voltage decreased to 0.005V and held at this voltage until the current decreased to 0.1 mA, then charged at a current of 1 mA until the cell voltage increased to 0.9 V. Typically cells were charged and discharged this way for 50 charge/discharge cycles. Table 4 lists the initial lithiation and delithiation capacities and the delithiation capacity of the cells after 50 cycles.

TABLE 4

Capacities After Cycling

| Example Number | First Lithiation Capacity (mAh/cm³) | First Delithiation Capacity (mAh/cm³) | Delithiation Capacity at Cycle 50 (mAh/cm³) |
|---|---|---|---|
| 3 | 1514.1 | 1051.8 | 754.9 |
| 4 | 1457.9 | 896.1 | 658.9 |
| 5 | 1528.8 | 1244.0 | 1237.3 |
| 6 | 1594.1 | 1499.6 | 1332.2 |
| 7 | 1771.2 | 1688.3 | 1583.1 |
| 8 | 1608.3 | 1051.7 | 519.3 |
| 9 | 1603.3 | 1282.7 | 870.7 |
| 10 | 1601.3 | 1441.7 | 1193.7 |
| 11 | 1629.2 | 1495.5 | 1357.6 |
| 12 | 1639.7 | 1533.6 | 1436.6 |
| 13 | 1603.0 | 1541.5 | 1453.7 |
| 14 | 1641.0 | 1500.2 | 980.6 |
| 15 | 1562.9 | 1453.7 | 696.8 |
| 16 | 1849.8 | 1680.9 | 1547.3 |
| 17 | 1806.0 | 1669.3 | 843.7 |
| 18 | 1718.8 | 1295.4 | 776.3 |
| 19 | 1991.1 | 1888.1 | 824.5 |
| 20 | 2091.9 | 2005.5 | 1698.9 |
| 21 | 2169.5 | 2081.9 | 1607.9 |
| 22 | 2053.9 | 1945.5 | 1647.1 |
| 23 | 2126.8 | 2053.0 | 1739.0 |
| 24 | 1494.6 | 1217.6 | 804.1 |
| 25 | 2105.5 | 1954.9 | 1651.3 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A composite particle comprising an electrochemically active metal phase, an insulating phase, and a conducting phase,
   wherein the electrochemically active metal phase comprises silicon;
   wherein each of the phases of the particle is amorphous or has crystalline grains,
   wherein the largest grain size of the particle as determined by the Scherrer equation is 14.9 nm or less; and
   wherein the phases are distributed substantially homogeneously throughout the particle.

2. A composite particle according to claim 1, wherein the electrochemically active metal phase occupies less than 50 volume percent of the volume of the composite particle.

3. A composite particle according to claim 1, wherein the insulating phase occupies less than 50 volume percent of the volume of the composite particle.

4. A composite particle according to claim 1, wherein at least one of the phases is amorphous.

5. A composite particle according to claim 1, wherein the insulating phase is selected from a borate, a phosphate, a carbonate, an oxide, a halide and combinations thereof.

6. A composite particle according to claim 5, wherein the oxide comprises Li, Na, Mg, Ca, La, Ce, Ti, Zr, K, Al, Si, B, or combinations thereof.

7. A composite particle according to claim 5, wherein the insulating phase is selected from $Al_2O_3$, $MgAl_2O_3$, $LiAlO_2$, $Li_2CO_3$, $SiO_2$, $B_2O_3$, and combinations thereof.

8. A composite particle according to claim 1, wherein the insulating phase occupies more than about 10 volume percent of the volume of the composite particle.

9. A composite particle according to claim 1, wherein the conducting phase is selected from a metal element, an alloy, a carbide, an aluminide, a silicide, a boride, a nitride, and combinations thereof.

10. A composite particle according to claim 9, wherein the conducting phase is selected from $TiSi_2$, TiC, $FeSi_2$, SiC, an iron titanium silicide and combinations thereof.

11. A composite particle according to claim 1, wherein the insulating phase is nonstoichiometric.

12. A composite particle according to claim 1, wherein the conducting phase is nonstoichiometric.

13. A composite particle according to claim 1, further comprising a coating at least partially surrounding the particle.

14. An electrode for a lithium-ion electrochemical cell comprising composite particles according to claim 1.

15. An electrochemical cell comprising an electrode according to claim 14.

16. An electronic device comprising an electrochemical cell according to claim 15.

17. A composite particle according to claim 1, formed after incorporating the particle into an electrode, incorporating the electrode into a lithium-ion electrochemical cell, and cycling the lithium-ion electrochemical cells through at least one charge-discharge cycle.

18. A method of forming composite particles comprising:
providing precursor materials; and
mechanically milling the precursor materials to form the composite particles,
wherein the composite particles include an electrochemically active metal phase, an insulating phase and a conducting phase; wherein the electrochemically active metal phase comprises silicon and each of the phases of the particle is amorphous or has crystalline grains,
wherein the largest grain size of the particles as determined by the Scherrer equation is 14.9 nm or less; and
wherein the phases are distributed substantially homogeneously throughout the particle.

19. A method of forming composite particles according to claim 18, wherein the precursor materials comprise silicon and additionally comprise one or more of $Al_2O_3$, $MgAl_2O_3$, $LiAlO_2$, $Li_2CO_3$, $SiO_2$, $B_2O_3$, LiF, $FeSi_2$, $CrSi_2$, $NiSi_2$, $CoSi_2$, $TiSi_2$, $Cu_3Si$, $ZrSi_2$, $TiB_2$, TiN, $FeAl_3$, $TiAl_3$, or combinations thereof.

20. A method of forming composite particles according to claim 18, wherein the precursor materials include materials that form an electrochemically active metal phase, insulating phase and conducting phase during mechanical milling.

21. A method of forming composite particles according to claim 20 wherein the precursor materials comprise silicon and additionally comprise one or more of $Fe_2O_3$, NiO, $Co_3O_4$, $Cu_2O$, $Mn_2O_3$, and $ZnO_2$, $Al_2O_3$, Ti, V, Cr, Mn, Fe, Co Ni, Cu, carbon, or combinations thereof.

22. A composite particle according to claim 1, wherein the insulating phase comprises $SiO_2$ and the conducting phase comprises a metal silicide.

23. A composite particle according to claim 1, wherein the conducting phase comprises an iron silicide.

* * * * *

UNITED STATES PATENT AND TRADEMARK OFFICE
CERTIFICATE OF CORRECTION

| | |
|---|---|
| PATENT NO. | : 8,753,545 B2 |
| APPLICATION NO. | : 12/716354 |
| DATED | : June 17, 2014 |
| INVENTOR(S) | : Mark Obrovac |

It is certified that error appears in the above-identified patent and that said Letters Patent is hereby corrected as shown below:

In The Specification

Column 1, Line 4, after the Title, please insert the following paragraph -- This invention was made with Government support under Contract No.: DE-EE0000650 awarded by the Department of Energy. The Government has certain rights in this invention. --

Signed and Sealed this
Ninth Day of August, 2016

Michelle K. Lee
*Director of the United States Patent and Trademark Office*